G. W. HART.
REMOTE CONTROL ELECTRIC SWITCH.
APPLICATION FILED JULY 12, 1916.
1,277,576.
Patented Sept. 3, 1918.
3 SHEETS—SHEET 1.
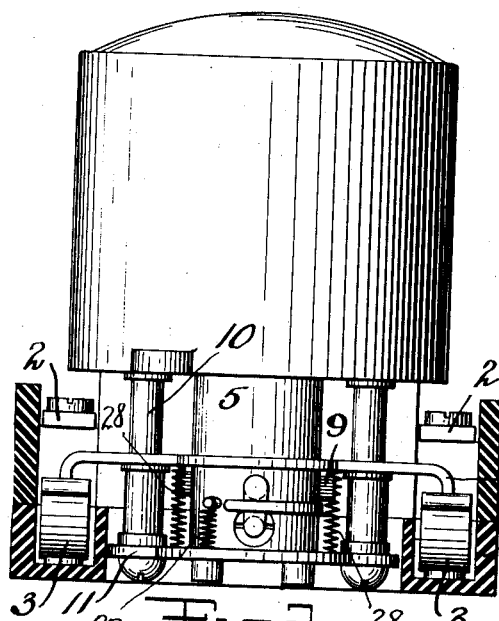
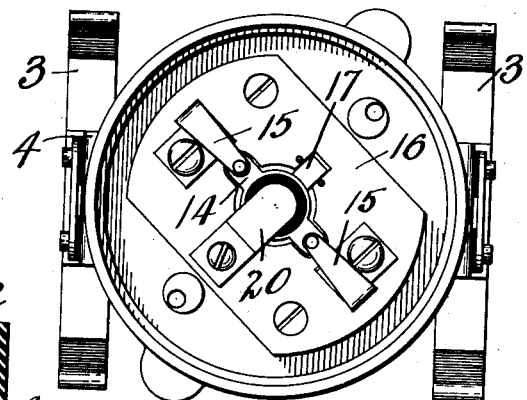
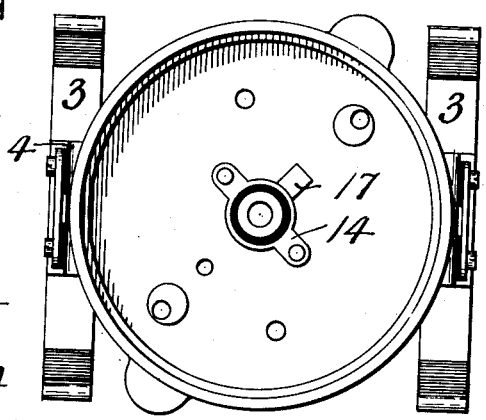
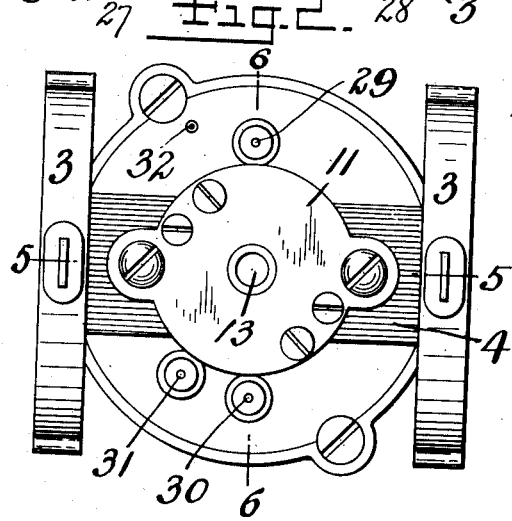
G. W. Hart, Inventor
By his Attorneys G. W. HART.
REMOTE CONTROL ELECTRIC SWITCH.
APPLICATION FILED JULY 12, 1916.
1,277,576.
Patented Sept. 3, 1918.
3 SHEETS—SHEET 2.
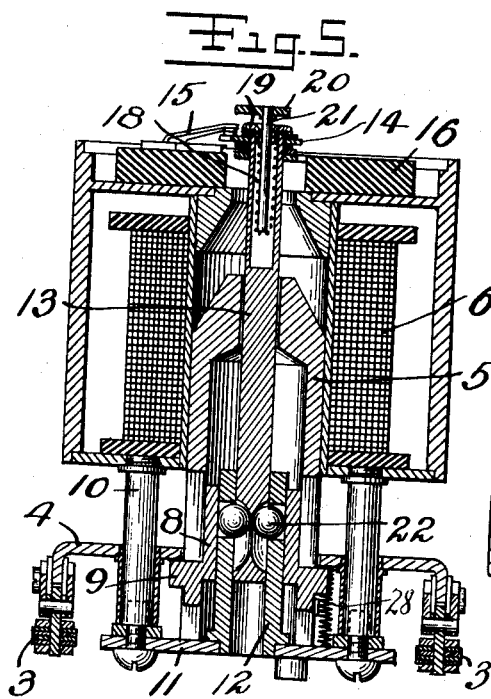
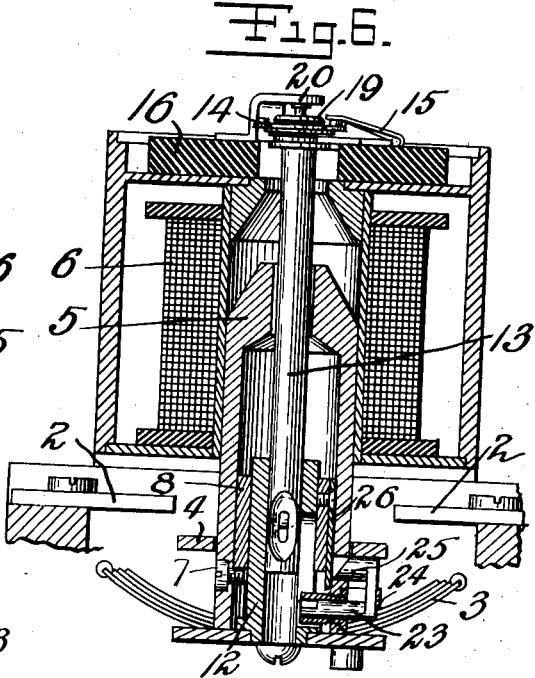
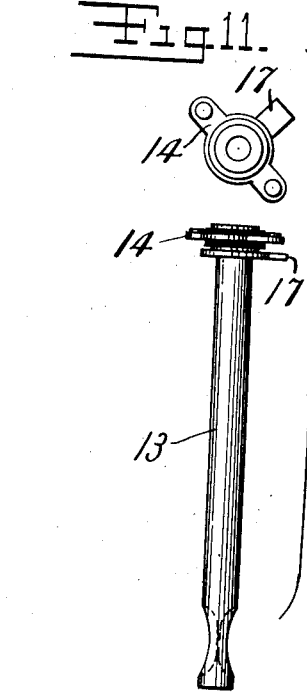
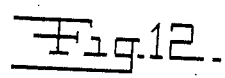
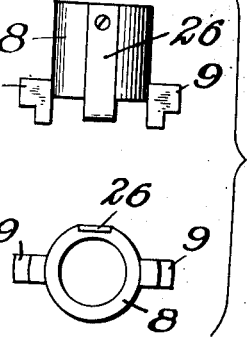
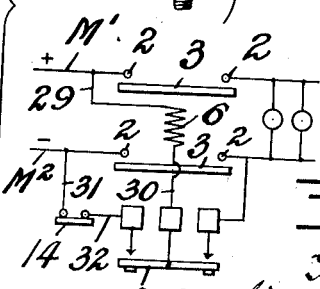

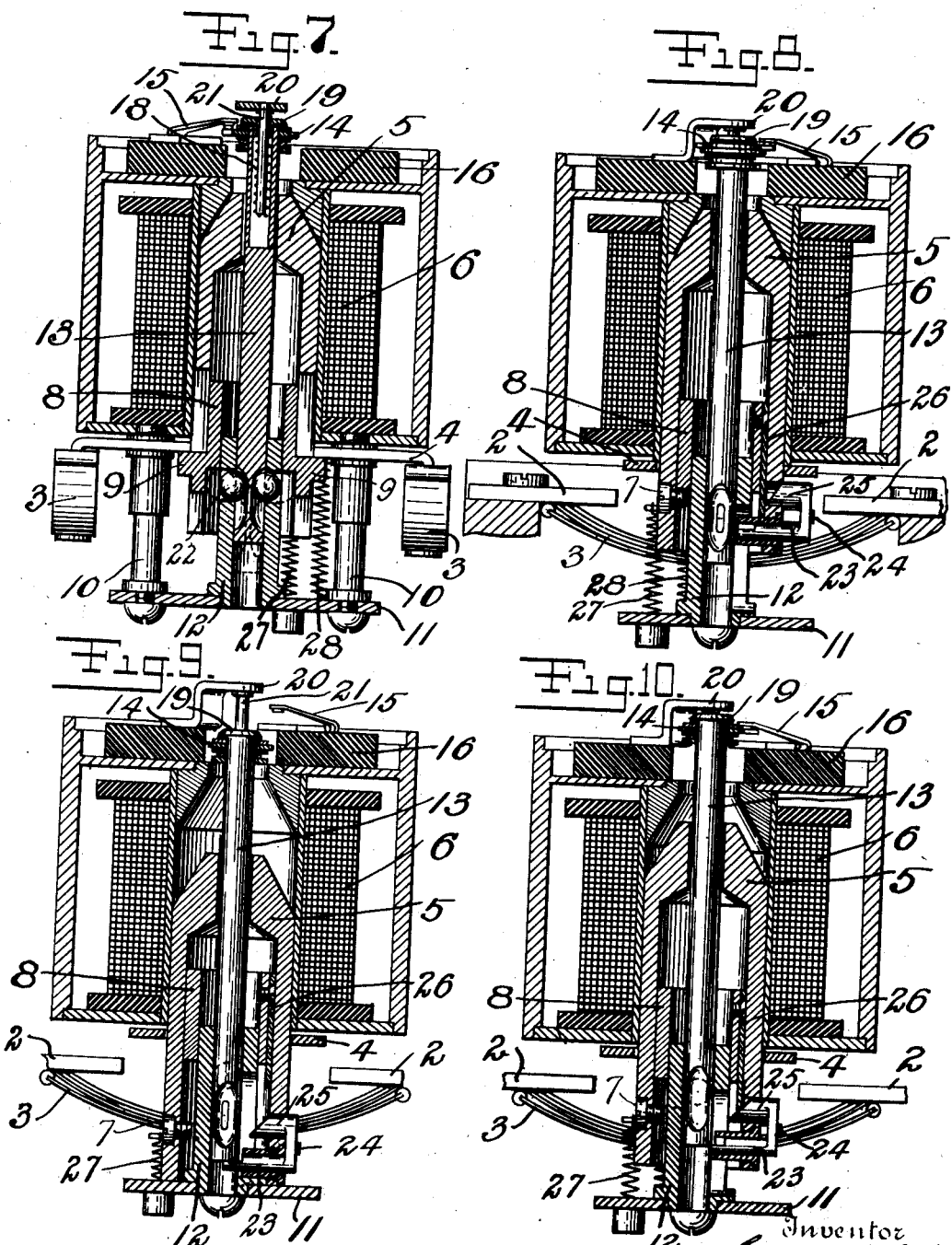

UNITED STATES PATENT OFFICE.

GERALD W. HART, OF WEST HARTFORD, CONNECTICUT.

REMOTE-CONTROL ELECTRIC SWITCH.

1,277,576.   Specification of Letters Patent.   Patented Sept. 3, 1918.

Application filed July 12, 1916. Serial No. 108,776.

*To all whom it may concern:*

Be it known that I, GERALD W. HART, a citizen of the United States, residing at West Hartford, county of Hartford, State of Connecticut, have invented certain new and useful Improvements in Remote-Control Electric Switches, of which the following is a full, clear, and exact description.

My invention relates to improvements in remote control electric switches and has for its object to produce a switch which can be operated electrically from a distance so as to open and close a main circuit, such switch having but a single energizing coil, which when energized successively acts to close a switch and then to open the switch and to provide reciprocating means for automatically interrupting the controlling circuits.

The following is a description of an embodiment of my invention, reference being had to the accompanying drawings, in which:

Figure 1 shows an end elevation of the switch with the base partially cut away.

Fig. 2 shows a bottom plan view of the switch with the base removed.

Fig. 3 shows a top plan view of the switch with the base removed.

Fig. 4 shows a similar view with certain other parts removed.

Fig. 5 is a vertical section of the switch mechanism on the line 5—5 Fig. 2.

Fig. 6 shows a vertical section view of the switch on the line 6—6, Fig. 2.

The main switch arm in both of the last instances is in open position.

Fig. 7 shows a vertical sectional view of the switch mechanism on the line 5—5, Fig. 2, with the main switch arm in closed position before locking.

Fig. 8 shows a vertical sectional view on the line 6—6 Fig. 2 with the main switch arm in closed position before locking.

Fig. 9 shows a vertical sectional view on the line 6—6 Fig. 2 with the main switch arm in locked closed position and with the armature restored position ready to be energized so as to open the main switch arm.

Fig. 10 shows a section of the switch on the line 6—6 Fig. 2 with the main switch arm in closed position and just released so as to permit it to begin to return to open position.

Figs. 11, 12 and 13 show plan and side elevations of certain parts.

Fig. 14 is a diagram of circuits.

Referring more particularly to the drawings, 1 is a base of insulating material having stationary contracts 2—2 adapted to be engaged by the main switch arms 3—3 carried by, but insulated from, a frame 4. This frame has an opening through which passes a cylindrical armature 5, surrounded by a solenoid 6 which solenoid when energized lifts the armature out of the position shown in Fig. 5 to the position shown in Fig. 7. This armature is provided with an inwardly projecting screw stud 7 which lies in the path of a movable cylindrical member 8 located within the armature so as to have lost motion with reference to the armature, which lost motion is limited by the stud 7. Upon the member 8 there are projections 9 which extend through slots in the armature and engage the underside of the frame 4, so that when the member 8 is lifted the frame 4 will also be lifted. The frame 4 slides upon guide posts 10 secured to the bottom of the solenoid 6 and carrying upon their bottom a plate 11 which in turn carries a stationary tubular member 12 which passes inside the movable tubular member 8. Within the tubular member 12 is a rod 13 which passes through the cylindrical armature to the top of the switch and is there provided with an insulated switch arm 14 which engages and disengages contacts 15 fixedly mounted upon an insulating plate 16. This rod and its switch arm are prevented from turning by a guiding stud 17 which plays up and down in a guiding slot in the member 16. The rod 13 is provided with a bore at its upper end in which is located a spring 18 depending from a disk 19 resting on the upper end of the rod 13. A bracket 20 mounted upon the top of the switch carries a depending pin 21 which passes through the spring 20 until it engages the lower end thereof holding the spring 20 extended under tension. This pin 21 acting through the spring 20 tends to hold the rod 13 in its down position so that the switch arm 14 is out of engagement with the contacts 15. It will, however, permit the rod to be raised so as to bring the switch arm 14 into engagement with the contacts 15. The cylindrical member 12 is provided with radial holes which contain locking ball detents 22. The member 8 is provided at its lower end with a surface constituting a movable abutment with which said balls are adapted to engage so as to hold the member 8 in elevated position, as shown in Fig. 7, when the balls are forced outward by the movement of the rod 13 downward to the position shown in dotted lines. The rod 13 is provided with two cavities into which the balls 22 are free to enter when the rod 13 is sufficiently raised, as shown in full lines in Fig. 7. When, however, the rod 13 is depressed to the position shown in dotted lines, the member 8 being in elevated position, the balls 22 are forced outward into the position shown in dotted lines in Fig. 8, so as to come beneath the shoulder or abutment on the member 8 and thus hold the member 8 in elevated position so long as the rod 13 is depressed. When the rod 13 is raised to elevated position, the member 8 is released and the balls 22 are forced by its downward movement into the recesses in the rod so as to engage the surfaces at the upper ends of the cavities in the rod 13 and hold the rod 13 in elevated position so long as the member 8 is depressed. The member 8 and the rod 13, therefore, have intimate reciprocal relations, the movement of one locking the other so that one of them is always locked in elevated position. The member 8 when in its lower position is lifted by action of the armature communicated thereto by the stud 7 when the armature is lifted, and when once lifted is locked in position upon the downward movement of the rod 13. In order to release the member 8 I provide means for raising the rod 13 through the action of the solenoid and armature. The result is that when the member 8 is in locked position and the solenoid is then energized the rod 13 will be lifted and the member 8 released. In order to provide means for lifting the rod 13 I provide a pawl 23 which is normally pressed toward the rod 13 by the spring 24, so as to have its end extend into the path of the rod 13 when the same is elevated and the armature is in its lower position. Connected to this pawl 23 is a member having a cam surface 25 and connected to the movable member 8 is a hardened steel pawl retracting plate 26. The cam surface 25 is such that when the rod 13 in depressed position as shown in Fig. 9 and the solenoid is energized so as to lift the pawl together with the rod 13 to the position shown in Fig. 10, the plate 26 as the member 8 is approached and moves downward on being released will engage the cam surface 25 so as to retract it and the nose 23 of the pawl and hold them in retracted position until the member 8 has been again lifted and locked in its upper position whereupon the rod 13 snaps downward. When the rod 13 is lowered into depressed position and the armature has moved downward, the end 23 of the pawl being then free from control by the member 8, will move beneath the lower end of the rod 13. When the armature is thereafter raised the pawl acts to lift the rod 13 and lifts it until its cavities come opposite the balls 22 whereupon the member 8 is released, the balls passing from beneath the member 8 into the cavities in the rod 13 and holding the rod 13 in elevated position. As the member 8 is again approached and comes down the plate 26 again engages the cam surface 25 and again withdraws the pawl nose 23 and holds it withdrawn so as not to engage the rod 13 when the member 8 is again raised to elevated position upon the energizing of the armature.

The plate 11 limits the downward movement of the armature. In order that the armature may be returned quickly to normal position I provide springs 27 which I connect to the armature and the plate 11 and which tend to draw the armature toward the plate. In order that the frame 4 together with the switch arms 3 and movable member 8 shall move down quickly I provide additional springs 28 which are connected to the frame 4 and the plate 11 so as to tend to draw the frame 4 toward the plate 11.

Fig. 14 shows a diagram of circuits. It is to be noted that the solenoid is permanently connected by a conductor 29 to one of the mains M' on the generator side of the main switch and to a terminal of a manual circuit controller by a conductor 30. This manual circuit controller has two other switch terminals, one of which is connected to the other main $M^2$ on the load side of the switch, while the other is connected to the second main $M^2$ on the generator side of the switch by conductors 31 and 32 through the contacts 15 controlled by the switch arm 14, the switch arm 14 being connected in series with said conductors 31 and 32 and said second manual switch terminal as shown. 33 indicates the movable element of the manual circuit controller which is preferably such that it can not be actuated to close both auxiliary circuits simultaneously.

The operation of the switch is as follows: Assuming that the main switch arms are in open position as shown in Fig. 1 pressure upon the left hand end of the member 33 of the auxiliary controller completes a circuit through the solenoid coil and the now closed switch arm 14 so that the solenoid coil is connected in circuit across the mains M' $M^2$. This results in energizing the solenoid which thereupon lifts the armature from the position shown in Figs. 5 and 6 to the position shown in Figs. 7 and 8, carrying with it the tubular member 8 and also the frame 4 with the main switch arms 3. As soon as the tubular member 8 has reached this position the balls 22 are free to pass from within the cavities in the rod 13 to beneath the shoulders on the tubular member 8 and the rod 13 being thus released is forced downward by the action of the spring 18 and forces the balls 22 beneath the shoulders on the tubular member 8 which acting with the stationary member 12 lock the tubular member 8 in elevated position, thus locking the main switch arms closed. As the rod 13 moves downward to force the balls 22 outward it moves the auxiliary switch arm 14 out of engagement with the contacts 15 and, therefore, automatically opens the auxiliary circuit which was established by the pressure upon the left hand end of the manual circuit controller member resulting in deënergizing the solenoid even though the auxiliary circuit just used is kept closed at the manual circuit controller. The closing of the main switch arm, however, connected the right hand terminal of the manual circuit controller with the generator through the main M² so that upon pressing the right hand end of the manual circuit controller member the solenoid will be again energized, the parts being then in the positions shown in Fig. 9 with the end 23 of the pawl beneath the lower end of the rod 13, said pawl having been freed from the control of the member 8 by the downward movement of the armature after the member 8 has been locked up and snapping beneath the rod 13 as soon as it reaches the lower end thereof. Now with the parts in the position shown in Fig. 9 when the right hand end of the manual circuit controller is actuated the solenoid is energized and lifts the armature 5, and the end 23 of the pawl being beneath the lower end of the rod 13, lifts that rod until its recesses come opposite the balls 22. This results in rendering the balls 22 free to move and enables the movable member 8 to move downward forcing the balls out of its path and into the recesses of the rod 13 locking the rod 13 in elevated position. As the member 8 is approached and moves downward the plate 26 engages the cam surface 25 and retracts the ball 23 holding it retracted, the rod 13 being at that time locked in elevated position and thus held independently of the pawl 23. As the member 8 moves downward the switch arms 3 leave their contact plates 2 so that a gap is produced in the auxiliary circuit which is connected to the right hand contact of the manual circuit controller, thus automatically breaking the circuit through that contact. In this way it will be seen that whenever an auxiliary circuit is used for either opening or closing the main switch that auxiliary circuit will be automatically opened as soon as it has performed its desired function. It is further to be noticed that the breaking and making of the auxiliary circuits is in each instance brought about by very definite and forcible reciprocating action and without the aid of any pivoted element and that the movement of the balls is limited to a fixed plane transverse to the axis of the stationary ball carrier 12.

As will be evident to those skilled in the art my invention relates to various modifications without departing from the spirit thereof or the scope of the appended claims.

What I claim is:

1. The combination of a stationary member, a detent carried thereby, two independently movable members separated by said stationary member and having abutment surfaces adapted to be engaged by said detent, the abutment surface of each member when in engagement with said detent tending to force said detent toward the other member, an armature and solenoid acting to move one of said members when said solenoid is energized, means whereby a different one of said members is moved by said armature upon each successive actuating movement of said armature.

2. The combination of a stationary member, a detent carried thereby, two independently movable members separated by said stationary member and having abutment surfaces adapted to be engaged by said detent, the abutment surface of each member when in engagement with said detent tending to force said detent toward the other member, an armature and solenoid acting to move one of said members when said solenoid is energized, means whereby a different one of said members is moved by said armature upon each successive actuating movement of said armature, contacts and switch arms carried by said members and coacting with said contacts.

3. The combination of a stationary member, a detent carried thereby, two independently movable members separated by said stationary member and having abutment surfaces adapted to be engaged by said detent, the abutment surface of each of said members tending to force said detent toward the other member, an armature and solenoid, a projection fixed relatively to said armature and adapted to engage one of said members, a pawl carried by said armature and movable relatively thereto, said pawl extending into the path of both members and adapted to be retracted by the member engaged by said projection when so engaged so as to be held out of the path of the other member.

4. The combination of a tubular stationary member, a detent carried thereby, two independently movable members one located within said tubular stationary member and the other surrounding the same, said movable members having abutment surfaces adapted to be engaged by said detent, an armature surrounding said three members, a solenoid surrounding said armature and means whereby a different one of said movable members is moved by said armature upon each successive actuating movement of said armature.

5. In an electric switch, the combination of two independently movable switch arms, a single actuating solenoid and a single armature common to said switch arms and relatively to which both of said switch arms are movable, means actuated by said solenoid and single armature for positively moving both of said switch arms one at a time, a different one of said switch arms being so moved by said single armature on each successive energizing of said solenoid, and means for automatically locking the switch arm so moved and simultaneously releasing the switch arm previously locked, said switch arms normally tending to move away from locked position and so moving when released.

6. In an electric switch, the combination of two independently movable switch arms, a single actuating solenoid and a single armature common to said switch arms and relatively to which both of said switch arms are movable, means actuated by said solenoid and single armature for positively moving both of said switch arms one at a time, a different one of said switch arms being so moved by said single armature on each successive energizing of said solenoid, and means for automatically locking the switch arm so moved and simultaneously releasing the switch arm previously locked, said switch arms normally tending to move away from locked position and so moving when released, contacts engaged and disengaged by said switch arms, each switch arm engaging a contact before the other switch arm disengages a contact and disengaging a contact after the other switch arm has engaged a contact.

7. The combination of a stationary member, a detent carried thereby, two independently movable members separated by said stationary member and having abutment surfaces adapted to be engaged by said detent, the abutment surface of each member when in engagement with said detent tending to force said detent toward the other member, an armature and solenoid acting to move one of said members when said solenoid is energized, means whereby a different one of said members is moved by said armature upon each successive actuating movement of said armature, one of said movable members being provided with a recess at one end, a spring depending into said recess, and a pin engaging said spring, said spring tending to move said member in a direction opposite to that in which it is moved by said armature.

8. The combination of a stationary member, a detent carried thereby, two independently movable members separated by said stationary member and having abutment surfaces adapted to be engaged by said detent, the abutment surface of each member when in engagement with said detent tending to force said detent toward the other member, an armature and solenoid acting to move one of said members when said solenoid is energized, means whereby a different one of said members is moved by said armature upon each successive actuating movement of said armature, one of said movable members being provided with a recess at one end, a spring depending into said recess, and a pin engaging said spring, said spring tending to move said member in a direction opposite to that in which it is moved by said armature, a switch arm carried by said last mentioned member adjacent to the mouth of said recess, and contacts coacting with said switch arm.

GERALD W. HART.